May 7, 1963 D. S. JUSTICE 3,088,882
SOLAR STILL
Filed Oct. 23, 1959
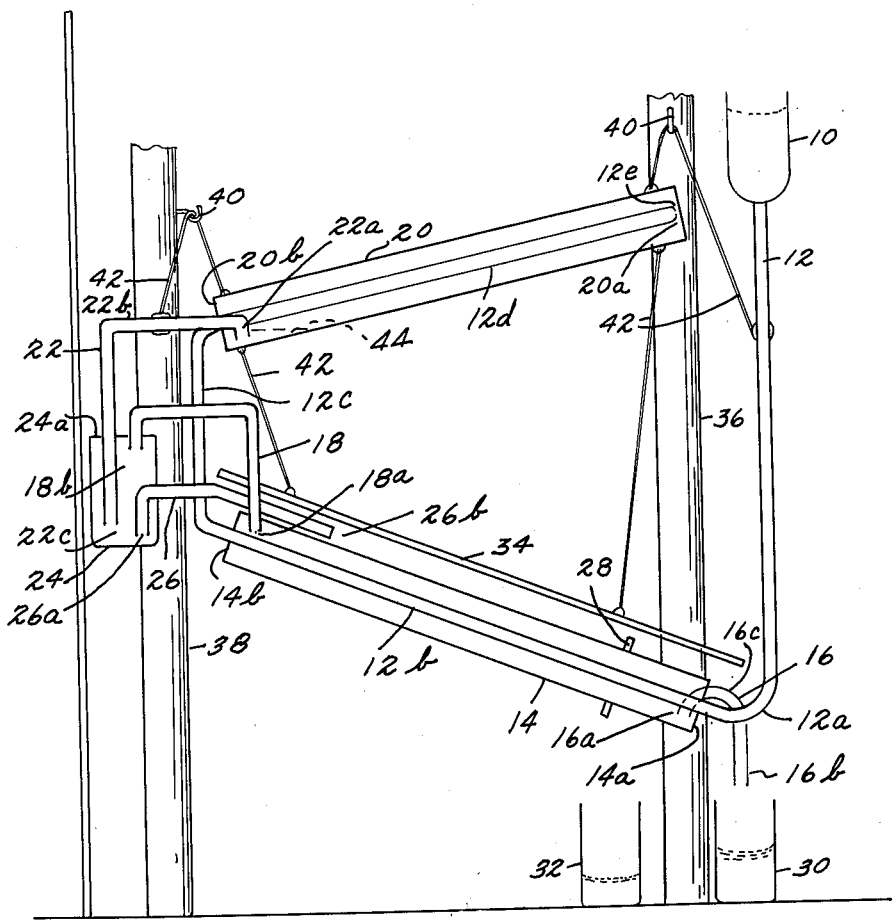
INVENTOR
DONALD S. JUSTICE
BY Cushman, Darby & Cushman
ATTORNEYS

3,088,882
SOLAR STILL
Donald S. Justice, Arlington, Va., assignor to The Justice Company, Washington, D.C., a corporation of the District of Columbia
Filed Oct. 23, 1959, Ser. No. 848,445
2 Claims. (Cl. 202—205)

This invention relates to apparatus for vaporizing and re-condensing liquids so as to purify same or for other purposes. In accordance with the invention, heat liberated by condensing liquid is utilized to preheat liquid which is to be vaporized, thereby increasing the volatility of the latter. The heat exchange in the preheating step is a cooling influence which aids condensation of vapor. Additionally, in accordance with the invention, radiant heat such as to be derived from ordinary sunshine is used to enhance the vaporization of liquid.

The principal object of the invention is to provide improved apparatus for the vaporization and re-condensation of liquids.

An additional object is to utilize radiant heat such as ordinary sunshine to enhance the operation of the apparatus.

A still further object of the invention is to provide a very compact and simple structure which may be assembled of inexpensive parts and readily erected at any place.

Further objects and the entire scope of the invention will become apparent from the following detailed description of an illustrative embodiment.

The illustrative embodiment of the invention can be best understood by reference to the accompanying drawing.

Reference character 10 designates a cylindrical reservoir for liquid to be vaporized and re-condensed, this cylinder being open at the top and communicating at the bottom with a conduit 12 having several parts or sections as follows: The first section designated 12 extends downwardly to an elbow section 12a followed by a section 12b, rising at an angle above the lowermost point of the elbow 12a. The next following section is 12c extending upwardly, and then a final section 12d inclined upwardly and shown directed back toward the reservoir 10. The end of the conduit 12 designated 12e has a certain cross-sectional area of opening, explained in greater detail hereinafter.

Section 12b of conduit 12 is surrounded by a housing member 14, shown as cylindrical and closed at its ends 14a and 14b, these ends, however, permitting the conduit section 12b to extend therethrough. At end 14a of housing 14 is also located a conduit 16, passing through end 14a, this conduit having an open intake end 16a and an open outlet end 16b, the latter end may be at a lower level than the intake end 16a, and there being a central point 16c of conduit 16 at an elevation above intake end 16a.

At its upper end housing 14 is further characterized by entry thereinto of a conduit 18 having an open outlet end 18a. An open inlet end 18b is provided in conduit 18, as will be explained in greater detail hereinbelow.

Section 12d of conduit 12 is surrounded by a housing 20, which may be cylindrical or of any convenient cross-sectional shape. Housing 20 is closed at its upper extremity by end 20a, and at its lower extremity by end 20b, the latter permitting, however, the entry of conduit 12 between its sections 12c and 12d. Also entering end 20b of housing 20 is a conduit 22 having an open intake end 22a located near the bottom of housing 20 adjacent the end thereof 20b. Conduit 22 is further characterized by a section 22b extending at an elevation slightly above the open end 22a. The remaining portion of conduit 22 extends downwardly to an open outlet end 22c located within a housing 24 into which the siphon device empties. The latter is provided with a top cover 24a which closes container 24 except for the entry of conduits 22 and 18, the previously mentioned inlet end 18b of conduit 18 being located just beneath the cover 24a. Within the housing 24 is also the open inlet end 26a of a conduit 26 which emerges from the housing 24 above the lower open exit end 22c of conduit 22. The open outlet end 26b of conduit 26 is positioned above the housing 14.

Near the lower end of housing 14 is a shoulder 28 surrounding the housing.

Reference character 30 designates any suitable container which may be placed beneath the open outlet end 16b of conduit 16 for collecting liquid which has been vaporized and re-condensed. Reference character 32 designates any suitable vessel placed beneath shoulder 28 for collecting liquid which has not been vaporized.

Reference character 34 designates a member suitable for suspension above the housing 14 and components therein for shading same from the direct rays of the sun.

The entire apparatus may be supported by any suitable means such as typical fence posts 36 and 38, by use of hooks 40 and suitable suspension wires or cords 42.

The operation of the illustrative embodiment is as follows: First assume the entire apparatus to be empty of liquid. Next assume that a quantity of liquid to be vaporized and redistilled—such as salt water to be purified—is poured into the top of reservoir 10. This liquid will flow downwardly through conduit 12, thence upwardly through its inclined section 12b, further upwardly through the vertical section 12c, and further upwardly through the section 12d to the open end 12e within housing 20. From open end 12e the liquid will flow downwardly in housing 20, and some will vaporize. Whatever portion which does not vaporize will collect in housing 20 until the level rises to the extent designated by reference character 44 whereupon the liquid will run through the conduit section 22b and out the open end thereof 22c into the housing 24.

At this point it is to be understood that the cross-sectional area of conduit 22 is to be greater than the cross-sectional area of opening 12e. Liquid in conduit 22 will cause it to act as a self-priming syphon. Inasmuch as the cross-sectional area of conduit 22 is greater than that of opening 12e, the supply of liquid in housing 20 will be rapidly depleted until the level 44 has gone below the open end 22a of conduit 22. At this moment a slug of vapor from within housing 20 will be attracted into the conduit 22. However, liquid from opening 12e will again begin to fill the housing 20 above its open end 22a. In this way, alternate slugs of liquid and vapor will pass through conduit 22 into housing 24, and this action will be such as to substantially reduce the vapor pressure within the housing 20. The reduction in pressure will enhance the vaporization of liquid within housing 20.

In housing 24, after a certain amount of liquid falls thereinto from conduit 22, housing 24 will become filled with liquid to the level of the horizontal section of conduit 26, whereupon this liquid will pass therethrough and out the open end 26b, whence it drops upon the housing 14. In the meanwhile, vapor liberated through the end 22c of conduit 22 will rise and collect in the upper end of the housing 24, and pass through conduit 18 into housing 14.

Liquid dropping from opening 26b of conduit 26 onto the outside of housing 14 will tend to cling to the housing 14 and run down along the exterior thereof, vaporizing as it does so. Whatever liquid reaches the shoulder 28 without having vaporized will fall into the container 32, and this liquid may be returned to the reservoir 10.

Within the housing 14, vapor issuing from opening 18a of conduit 18 will condense. Condensation will occur because of several factors, one being that the latent heat of condensation may be exchanged into the relatively cold liquid passing through conduit section 12b. By suitable shading also of reservoir 10, the coolness of the liquid and therefore the condensation may be enhanced. As above stated, liquid on the exterior of housing 14 from conduit 26 will be vaporized, and this also serves to extract heat from the housing 14, thus enhancing the condensation of vapor therein. If desired, suitable fins (not shown) or other conventional means may be employed on the exterior of conduit section 12b and on the interior of housing 14 so as to further enhance the opportunity for vapors from 18a to be cooled and therefore to condense.

Liquid condensing within housing 14 collects at the bottom end and enters the conduit 16 via its intake end 16a. As soon as this liquid has risen to the level of the water level 16c of conduit 16, it will syphon over and run into vessel 30.

It will be understood that with the housing 20 exposed to direct rays of the sun, the heating effect within this housing will enhance the vaporization action.

Action of the apparatus is further enhanced by causing a black exterior surface to be present on housing 20, for absorbing heat. Additionally a white or reflective exterior surface on housing 14 will reduce absorption of heat by radiation, and enhance the condensing action within this housing.

It will be noted that in the event of complete vaporization within the evaporator housing 20, the vapor will have open passageway and flow by gravity into the condenser section within the housing 14.

It will now be further apparent that the invention basically provides a compact vaporization and re-condensation apparatus wherein liquid flowing to a zone of vaporization absorbs heat from a zone of condensation. Additionally, the rays of the sun may be utilized to heat and therefore enhance the vaporization action, while the condensation section may be shaded from the direct rays of the sun, to enhance the re-condensation action.

The purpose of the foregoing description of an illustrative embodiment is simply to aid in an understanding of the invention, and the true scope thereof is to be determined by the following claims.

I claim:

1. Purification apparatus comprising container means at a predetermined elevation for containing a supply of liquid to be purified, a first conduit section, a second conduit section positioned above the first conduit section, a conduit section joining said supply container to the inlet end of the first conduit section, a conduit section joining the outlet end of the first conduit section with the inlet end of the second conduit section, an upwardly extending evaporation enclosure means about said second conduit, an outlet opening of predetermined cross sectional area in said second conduit section within said enclosure means, a siphon device having an intake within said evaporation enclosure below the level of said outlet opening in said conduit therein, the siphon intake having a greater cross sectional area than said outlet opening, whereby the siphon device extracts alternate quantities of liquid and vapor from said evaporation enclosure, a housing into which said siphon empties, a vapor outlet conduit from said housing, a downwardly extending condensation enclosure about said first conduit, the vapor outlet conduit from said housing communicating with said condensation enclosure, and a discharge opening from the condensation enclosure at a point below the entry thereinto of said vapor outlet conduit, the arrangement being such that said siphon means will withdraw liquid from said evaporation enclosure more rapidly than liquid enters same, thereby reducing the vapor pressure within said evaporation enclosure and enhancing evaporation, and the vapor expelled from said siphon means is cooled by incoming liquid in said first conduit within said condensation enclosure to enhance the condensation of said vapor to produce purified liquid within the latter enclosure.

2. Apparatus as in claim 1 and further including a conduit connected with the housing into which said siphon means empties for extracting liquid from said siphon means and running same over the outer surface of said condensation enclosure to further cool same and enhance said condensation therein.

References Cited in the file of this patent

UNITED STATES PATENTS

| | | |
|---|---|---|
| 1,466,221 | Foster et al. | Aug. 28, 1923 |
| 2,025,724 | Clendenin | Dec. 31, 1935 |
| 2,141,330 | Abbot | Dec. 27, 1938 |
| 2,342,062 | Schenk | Feb. 15, 1944 |
| 2,379,519 | Hall | July 3, 1945 |
| 2,424,142 | Bimpson et al. | July 15, 1947 |
| 2,490,659 | Snyder | Dec. 6, 1949 |
| 2,515,013 | Kruhmin | July 11, 1950 |
| 2,716,446 | Ross | Aug. 30, 1955 |